United States Patent
McCarthy

(10) Patent No.: US 11,359,389 B2
(45) Date of Patent: Jun. 14, 2022

(54) METHOD AND APPARATUS FOR SUPPORTING SHEETING MATERIALS

(71) Applicant: Jennifer McCarthy, South Hadley, MA (US)

(72) Inventor: Jennifer McCarthy, South Hadley, MA (US)

( * ) Notice: Subject to any disclaimer, the term of this patent is extended or adjusted under 35 U.S.C. 154(b) by 0 days.

(21) Appl. No.: 16/908,968

(22) Filed: Jun. 23, 2020

(65) Prior Publication Data

US 2020/0318365 A1 Oct. 8, 2020

Related U.S. Application Data

(63) Continuation of application No. 15/173,346, filed on Jun. 3, 2016, now abandoned.

(51) Int. Cl.
*F16M 13/00* (2006.01)
*E04F 21/18* (2006.01)
*F16M 13/02* (2006.01)

(52) U.S. Cl.
CPC ............ *E04F 21/185* (2013.01); *E04F 21/18* (2013.01); *E04F 21/1877* (2013.01); *E04F 21/1894* (2013.01); *F16M 13/00* (2013.01); *F16M 13/027* (2013.01)

(58) Field of Classification Search
CPC . E04F 21/18; E04F 21/185; E04F 2121/1805; E04F 21/1877; E04F 21/1894; F16M 13/00; F16M 13/04; F16M 13/02; E04G 21/14; E04G 21/167; E04G 21/16
See application file for complete search history.

(56) References Cited

U.S. PATENT DOCUMENTS

| | | | | |
|---|---|---|---|---|
| 770,050 A * | 9/1904 | Dreyer | ............... | F16B 7/0446 403/190 |
| 1,419,563 A * | 6/1922 | Horning | .................. | E06C 9/04 182/92 |
| 1,546,721 A * | 7/1925 | Davis | ..................... | B25B 5/08 269/104 |
| 1,701,087 A * | 2/1929 | Tangard | ............ | E04D 13/0725 248/48.1 |
| 2,765,465 A * | 10/1956 | Sorenson | .............. | E04G 21/16 227/120 |
| 2,842,264 A * | 7/1958 | Charles | ................ | A47F 5/0823 206/526 |
| 3,041,033 A * | 6/1962 | Schwartz | ............ | A47B 96/061 248/248 |
| 3,053,491 A * | 9/1962 | Ramser | .............. | E04D 13/0725 248/48.2 |

(Continued)

*Primary Examiner* — Phi D A
(74) *Attorney, Agent, or Firm* — Patent Service Associates, Inc.; Lyman Smith

(57) ABSTRACT

A device for stabilizing a sheet material to a stud member includes two side members that sandwich the stud member and a back member joining the two side members together. One or more protrusions may extend inward from one or both of the side members so that the device is frictionally fit and secured to the stud member. A shelf extends away and outward from the back member so that the sheet material can be placed on the shelf before the sheet member is fastened to the stud member. The device can include an angled portion at the bottom of the back member so that a hammer can apply a force to the angled portion to cause the device to move away from the stud member for removal.

15 Claims, 5 Drawing Sheets

(56) References Cited

U.S. PATENT DOCUMENTS

| | | | |
|---|---|---|---|
| 3,497,033 A * | 2/1970 | Herrenkohl | A63B 27/00 182/92 |
| 3,633,950 A * | 1/1972 | Gilb | E04B 1/2608 403/384 |
| 3,737,127 A * | 6/1973 | Maloney, Jr. | E04D 13/0725 248/48.2 |
| 4,322,050 A * | 3/1982 | Roach | A47H 1/122 248/222.51 |
| 4,674,721 A * | 6/1987 | Thalenfeld | A47F 5/0869 248/222.51 |
| 4,678,151 A * | 7/1987 | Radek | A47F 5/0846 211/59.1 |
| 4,782,642 A * | 11/1988 | Conville | E04F 13/081 52/770 |
| 4,895,331 A * | 1/1990 | Nehls | A47B 57/565 108/108 |
| 5,224,309 A * | 7/1993 | Bodell | E04G 21/26 248/544 |
| D367,001 S * | 2/1996 | Bright | D8/381 |
| 5,917,701 A * | 6/1999 | Solberg | H01L 23/4093 257/E23.086 |
| 6,266,937 B1 * | 7/2001 | Watanabe | E04F 13/0826 24/292 |
| D455,641 S * | 4/2002 | Trifilio | D8/354 |
| 6,484,981 B1 * | 11/2002 | Perrault | A63B 27/00 182/92 |
| 6,491,272 B1 * | 12/2002 | Franks | E06C 1/34 182/92 |
| 6,543,729 B1 * | 4/2003 | Ylonen | E04D 13/0725 248/48.1 |
| 6,749,161 B1 * | 6/2004 | Will | A47F 5/0846 211/57.1 |
| D502,388 S * | 3/2005 | Cortez | A47F 5/0823 D8/356 |
| 7,086,125 B2 * | 8/2006 | Slobodecki | B60R 13/0206 24/293 |
| 7,124,551 B1 * | 10/2006 | Patera | E04F 21/1855 52/749.1 |
| D549,562 S * | 8/2007 | Browne | A47F 5/0823 D8/373 |
| 7,523,894 B1 * | 4/2009 | Eddy | E04D 13/0725 248/216.1 |
| 7,717,278 B2 * | 5/2010 | Kao | B25H 3/04 211/70.6 |
| 7,753,327 B2 * | 7/2010 | Wooten | A47B 96/061 248/248 |
| 7,950,534 B2 * | 5/2011 | Kao | A47F 5/0846 211/70.6 |
| 8,191,335 B2 * | 6/2012 | Davis | E04G 21/1891 52/749.1 |
| 8,418,410 B2 * | 4/2013 | Martin | E04D 13/0725 52/12 |
| 8,667,765 B1 * | 3/2014 | McCarthy | E04F 13/0841 52/745.1 |
| 8,875,357 B2 * | 11/2014 | Reznar | B60J 3/0217 24/458 |
| 9,206,594 B1 * | 12/2015 | Grevious | E04B 1/2612 |
| 10,539,266 B2 * | 1/2020 | Will | F16M 13/02 |
| 2005/0166484 A1 * | 8/2005 | Richmond | E04F 21/185 52/127.12 |
| 2006/0080934 A1 * | 4/2006 | Petrova | F16B 15/0046 52/848 |
| 2008/0209850 A1 * | 9/2008 | Boucher | E04F 21/1894 52/745.05 |
| 2010/0314514 A1 * | 12/2010 | Nelson | F16M 11/08 248/219.1 |
| 2013/0174498 A1 * | 7/2013 | Hovren | E04G 21/1891 52/105 |
| 2016/0265566 A1 * | 9/2016 | Talley | F16B 2/24 |
| 2017/0350143 A1 * | 12/2017 | McCarthy | E04F 21/185 |

* cited by examiner

METHOD AND APPARATUS FOR SUPPORTING SHEETING MATERIALS

BACKGROUND OF THE INVENTION

1. Field of the Invention

One or more embodiments of the invention relates generally to construction tools. More particularly, the invention relates to methods and apparatus for supporting sheeting materials through the use of an easily removable sheeting holder that can be removably attached to a wall stud, for example.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Sheet materials (also referred to as sheathing), such as drywall and Sheetrock®, plywood, pressboard, plasterboard, cement board, and the like, are commonly used in residential, commercial and industrial buildings for covering walls or ceilings. The sheets are manufactured in standard sizes, such as 4 by 8 feet or 4 by 12 feet, for example. Due to the size and weight of these sheet materials, fastening of the sheets to horizontal, vertical, or angular studs, joists, rafters or trusses can be tiring and awkward, especially when only one or two installers are on the job site.

Various devices have been used to temporarily support the sheet materials before attaching them to the underlying structures such as wall studs or roof rafters. These devices usually are designed to allow one installer to do the job. Many though are cumbersome and expensive. Others require the use of separate nails or screws to attach them.

Typically, "dead man" braces, panel lifts or jacks, clamps, clips, and so-called "cleats" have been used. Examples are disclosed below.

A "dead man" brace is typically fabricated from at least two pieces of 2 by 4 foot lumber in a "T" orientation, and is generally used to temporarily support sheetrock during ceiling installation. It is generally fabricated on the job site to accommodate a specific height dimension, is large and cumbersome in its size, and is not easily transported from one job site to the next.

U.S. Pat. No. 3,143,219 to Aldrich et al. discloses a "Ceiling Board Jack" for supporting ceiling boards. The "Ceiling Board Jack" has several moving pieces which have to be manipulated for the Jack to work.

U.S. Pat. No. 5,002,446 to Anderson, entitled "Tool for Overhead Sheet Installation", discloses a support tool for sheet material. Anderson's tool incorporates a screw and a base with a ledge to support the sheet material.

U.S. Pat. No. 5,224,309 to Bodell, entitled "Temporary Cleat for Sheet Goods", describes a relatively thin and wide multi-piece assembly that temporarily supports sheet material. The cleat is nailed to an underlying support and is adjustable to accommodate sheet material of various thicknesses.

U.S. Pat. No. 5,249,405 to Miller, entitled "Drywall Support", describes a relatively thin flat device, except for a right angle offset. The flat portion has two ends, one of which is pointed. By hammering the other end, the pointed end can be driven into a stud for the temporary support of sheetrock.

U.S. Pat. No. 5,640,826 to Hurilla, Jr. discloses a "Sheetrock Lifting Apparatus" for lifting a Sheetrock® sheet to a ceiling, and then aligning the sheet prior to nailing. The lifting device includes a flat support attached to a telescopic support arm.

U.S. patent publication No. 2005/0166484, filed by Richmond, entitled "Device and Method for Installing Building Material", discloses a handheld clamp with a cross-member or resting surface on which the clamped material sits. That hand tool enables a user to move and align building materials, such as drywall, for nailing to wall studs.

U.S. Pat. No. 6,494,513 to Worthington, entitled "Hand Tool for Gripping and Carrying Objects", discloses a hand tool for gripping and moving building materials, such as drywall.

U.S. Pat. No. 7,373,862 to Tyler, entitled "Clamp Device", discloses a locking clamp having two extended vertical arms. An individual can use this clamp to lift and transport building materials.

U.S. Pat. No. 8,303,228 to Gosis et al., entitled "Metal to Metal Cleat", discloses a "cleat" as a tapered, flat, metal piece with jagged sides. The cleat tapers to an end, which can be hammered into a support beam.

A seller, identified as "Free Hands Drywall Cletes" on Amazon.com, has designed a "Free Hands Drywall Installation tool". The tool is generally "L"-shaped which can be screwed into a support beam. The vertical stem of the L is partially recessed on its backside, adjacent the beam. An installer can insert a sheet rock into that recess for support.

U.S. patent publication No. 2006/0185278, filed by Jaffe, entitled "Dry Wall Installation Clips", discloses a generally "U"-shaped holder or clip. To attach the clip to an overhead beam, a user drives a nail through a hole in the clip and into the beam. The clip can then support a sheet at one end. That allows one person to install this material without additional help.

In view of the foregoing, it is clear that these traditional techniques are not perfect and leave room for more optimal approaches.

SUMMARY OF THE INVENTION

Accordingly, it is a primary object of the present invention to provide an improved tool for hanging sheathing which overcome the problems associated with the prior art.

It is another general object to provide a sheetrock support tool which does not require any separate nails or screws to install, and is simple to use.

It is another general object, commensurate with the above-listed objects, to provide a tool which can be quickly removed from an underlying structure and reused if undamaged.

Embodiments of the present invention provide a tool for positioning a sheet member comprising a pair of side members configured to straddle a stud member; a back member disposed between back sides of the pair of side members; at least one protrusion extending inward from at least one of the pair of side members; a shelf extending at a first angle away from a top portion of the back member; and an angled portion extending at a second angle away from a bottom portion of the back member.

Embodiments of the present invention further provide a tool for positioning a sheet member comprising a pair of side members configured to straddle a stud member, wherein at least a portion of an outer edge of the pair of side members is rounded; a back member disposed between back sides of the pair of side members; at least one protrusion extending inward from each of the pair of side members, the at least one protrusion positioned along a top edge of the side members; a shelf extending at a first angle away from a top portion of the back member; a lip extending at a third angle at a distal end of the shelf; and an angled portion extending at a second angle away from a bottom portion of the back member.

Embodiments of the present invention also provide a method for stabilizing a sheet material onto a stud member comprising positioning tool onto the stud member, the tool having a pair of side members configured to straddle a stud member, a back member disposed between back sides of the pair of side members, at least one protrusion extending inward from at least one of the pair of side members, a shelf extending at a first angle away from a top portion of the back member, and an angled portion extending at a second angle away from a bottom portion of the back member, wherein the at least one protrusion frictionally secures the tool onto the stud member; placing the sheet material onto the shelf of the tool; securing the sheet material to the stud member; applying a force to the angle portion to cause a portion of the tool to move away from the stud member; and removing the tool from the stud member.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
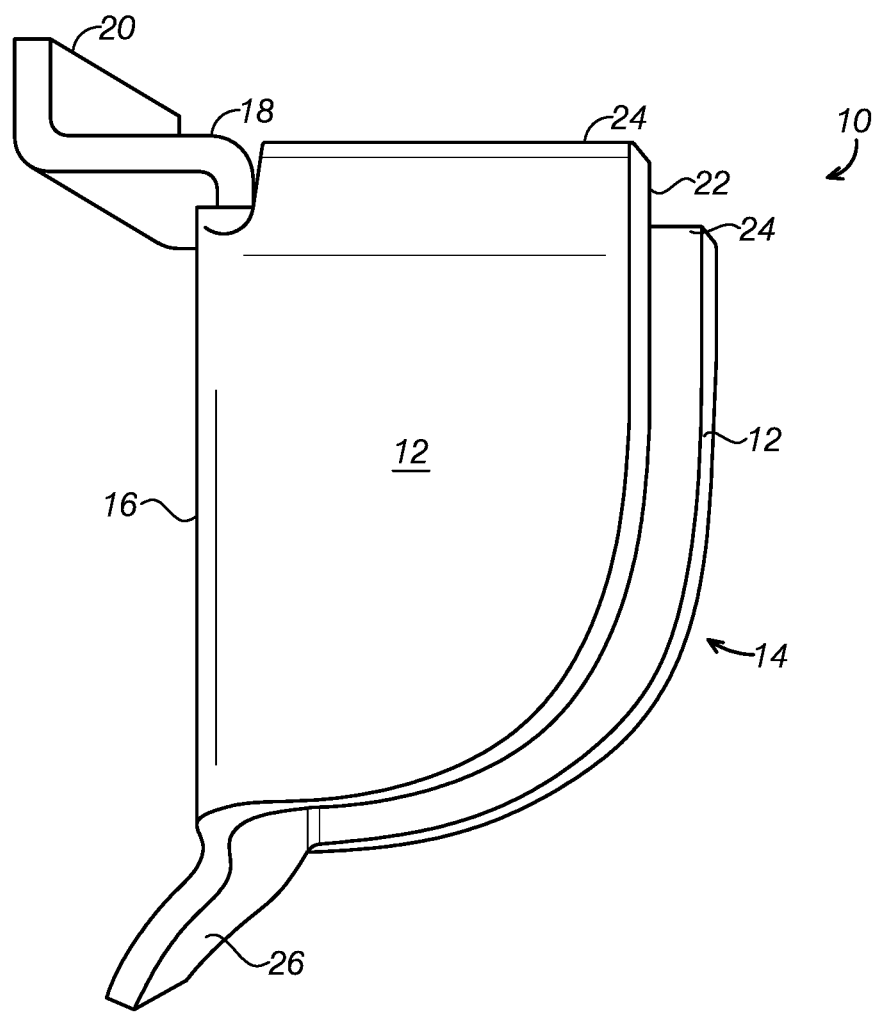
FIG. 1 illustrates a side view of a sheet material supporting device according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Figure 2:
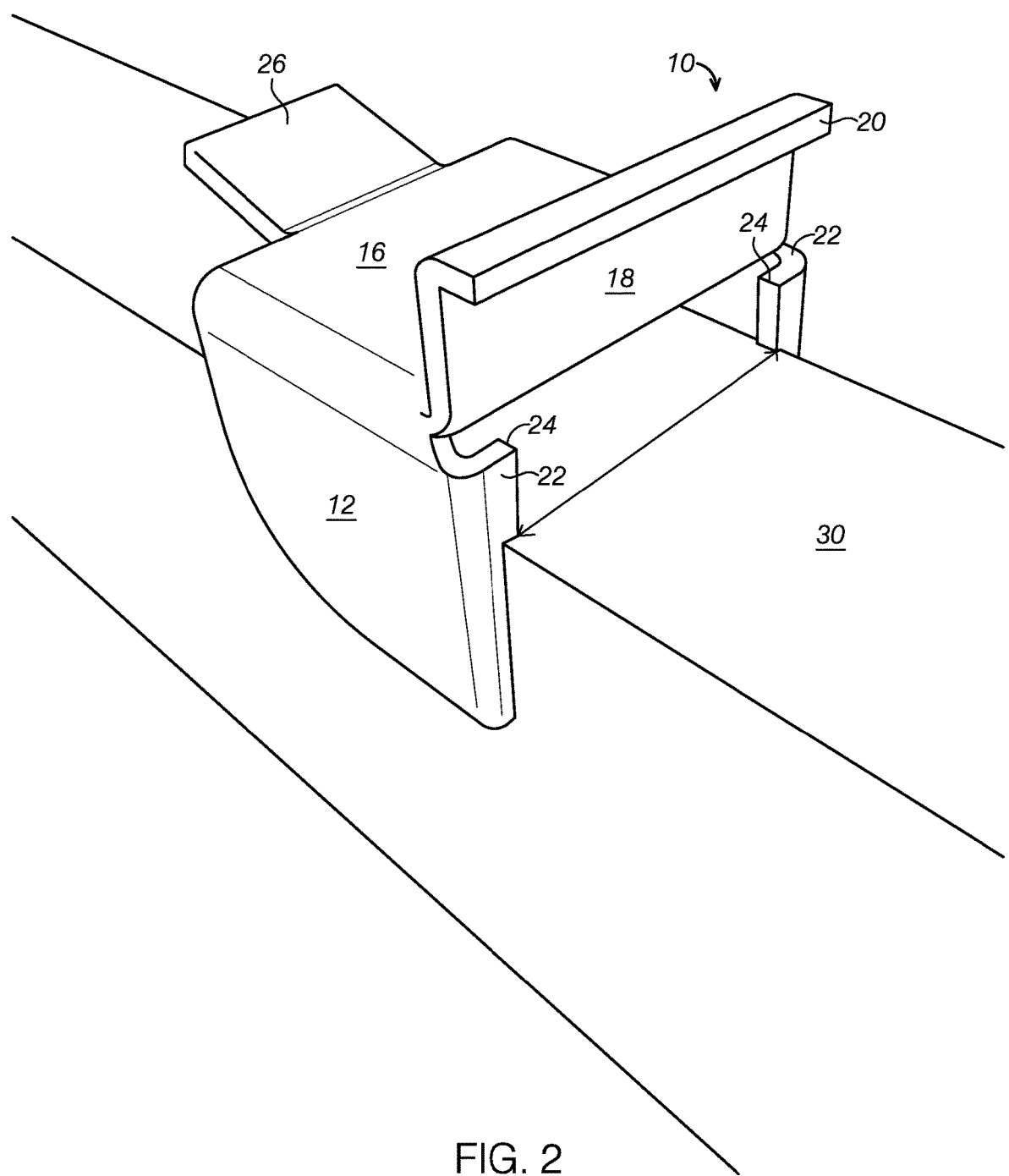
FIG. 2 illustrates a perspective view of the sheet material supporting device of FIG. 1 attached to a stud member.
Figure 3:
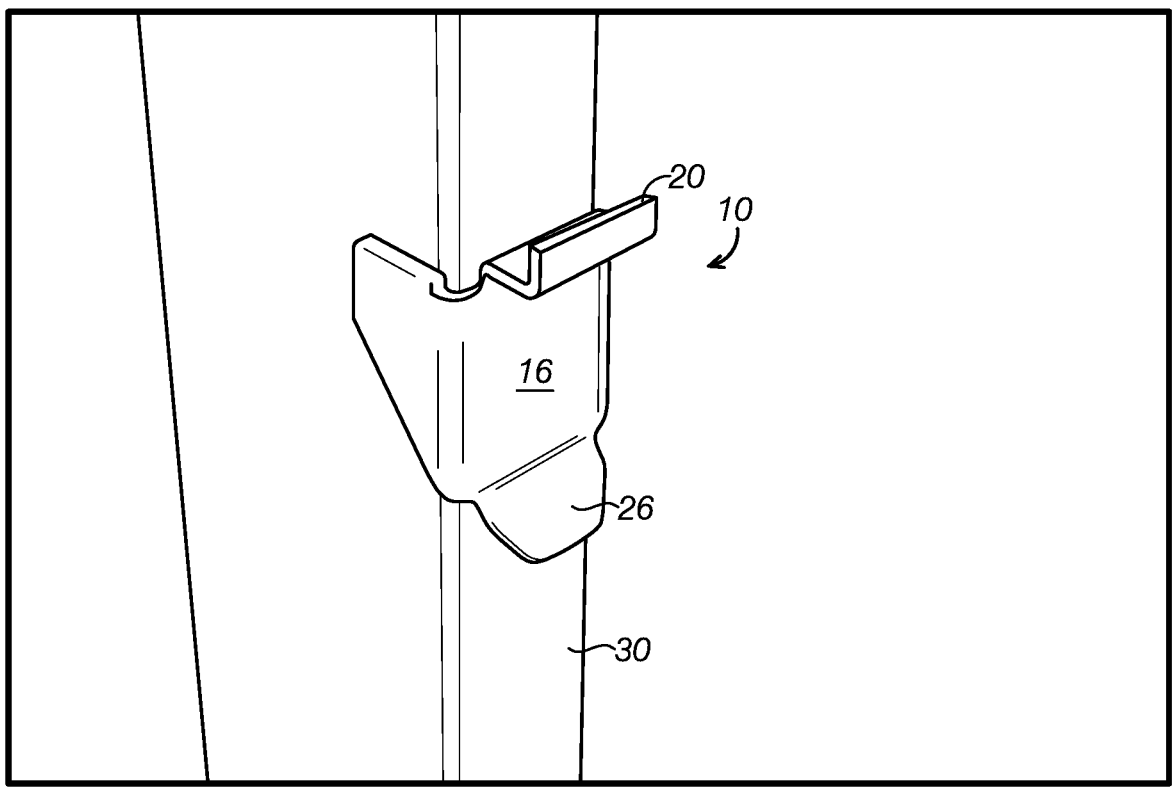
FIG. 3 illustrates a side perspective view of the sheet material supporting device of FIG. 1 attached to a stud member.

Referring now to FIGS. 1 through 3, a sheet supporting device 10 (also referred to simply as supporting device 10 or simply device 10) can include side members 12 configured to straddle a stud member 30. A back member 16 connects the side members 12 along one edge thereof. A shelf 18 extends from a top edge of the back member 16, away from the side members 12. The shelf 18 can extend from the back member 16 at about a 90 degree angle. In some embodiments, the shelf 18 may slope slightly toward the back member 16. In this embodiment, when a sheet 32 (see FIG. 4) is placed on the shelf 18, the sheet 32 is urged toward the stud members 30.

In some embodiments, a lip 20 may extend from a distal edge of the shelf 18 (distal relative to where the shelf 18 connects to the back member 16). The lip 20 typically extends generally parallel to the stud member 30 when the device 10 is attached to the stud member 30, as shown in FIGS. 2 and 3. The lip 20 may be useful to prevent the sheet 32 from slipping away from the stud member 30 and off the shelf 18.

Protrusions 24 may extend inward from each side member 12. The protrusions 24 can have a distance 28 therebetween that is slightly smaller than the stud member 30. Thus, the device 10 can be press-fitted onto the stud member 30 and held in place by the protrusions 24. In some embodiments, the protrusions 24 are formed at the top edge 22 of the side members. Of course, other protrusion locations are contemplated and included within the scope of the present invention.

Figure 4:
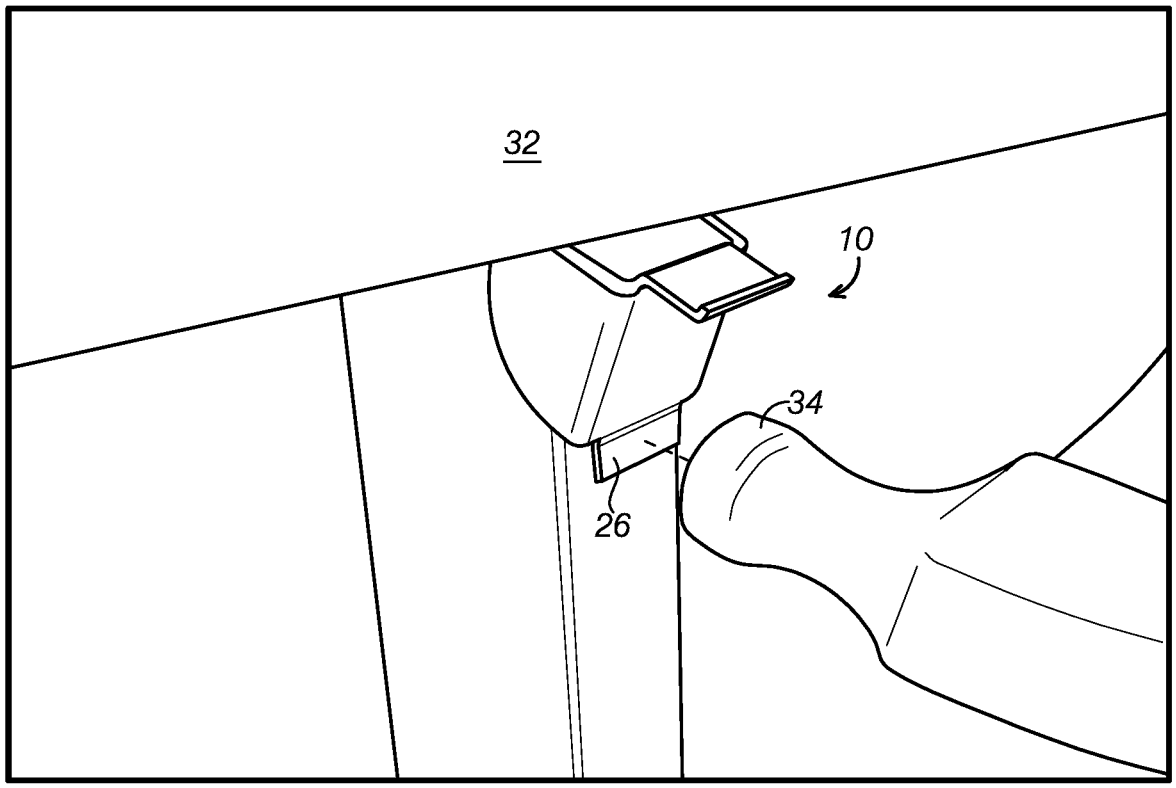
FIG. 4 illustrates removal of the sheet material supporting device of FIG. 1 once the sheet material is attached.

A bottom side of the back member 16 (opposite the shelf 18) can be disposed an angled portion 26. The angled portion 26 angles away from the stud member 30 and is integral with the back member 16. As shown in FIG. 4, a hammer 34 or other such tool can apply a force to the angled portion 26 to move the top side of the back member 16 outward and away from the stud member 30, as shown. This allows a user to grip the device 10 and remove it from the stud member 30. The angle of the angled portion 26 may vary, but is typically from about 10 to about 45 degrees away from the plane of the back portion 16.

In some embodiments, as shown in FIGS. 1 through 3, a distal edge 14 of the side members 12 can be rounded. The rounded edge 14 can be useful when the device 10 is used to raise a sheet from ground level. A user may place a sheet on the angled portion 26 and then apply a pressure to the lip 20 to cause the device 10 to act as a lever and fulcrum to raise the sheet off the ground level.

Figure 6:
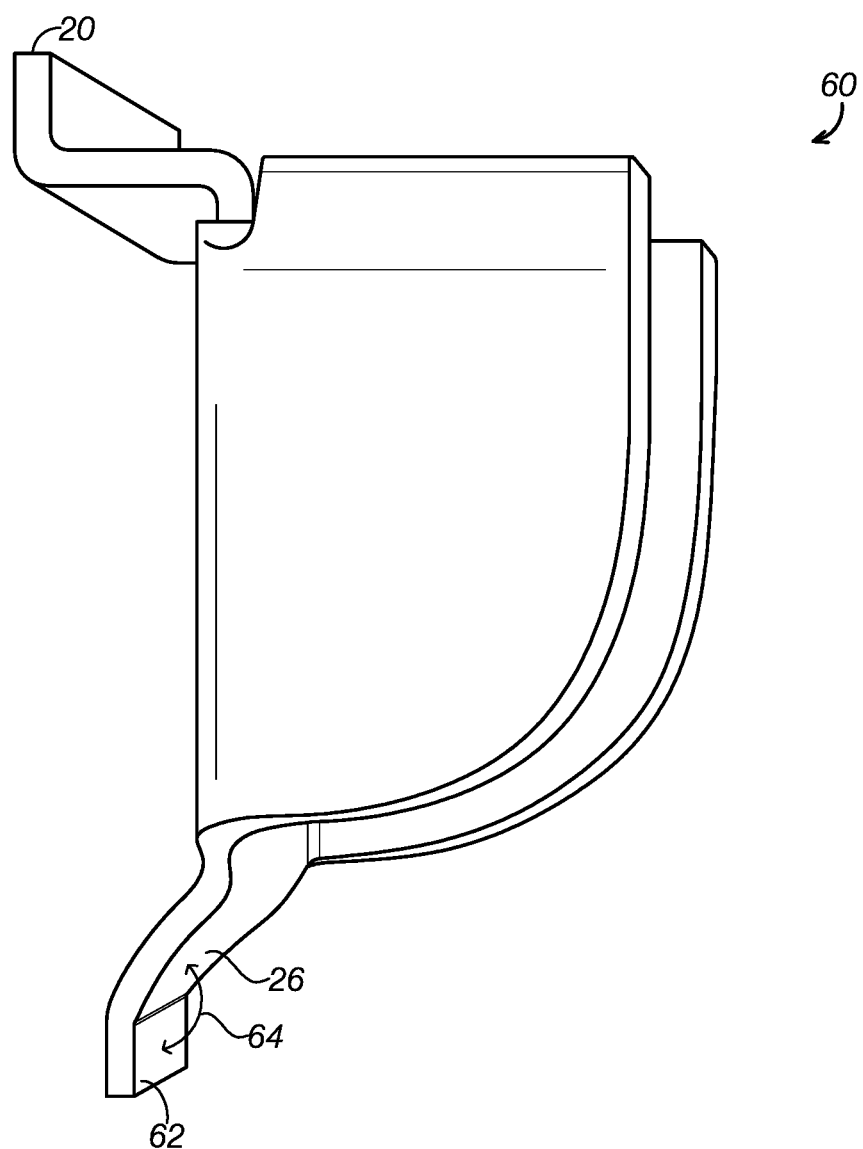
FIG. 6 illustrates a side view of an alternate embodiment of a sheet material supporting device according to an exemplary embodiment of the present invention.

As shown in FIG. 6, in some embodiments, a device 60 can have the angled portion 26 with a lip 62. The lip 62 may be formed substantially parallel to the back member 16. In some embodiments, the angle 64 may be made larger or smaller, depending on the particular application. The lip 62 may be useful to help retain the sheet material that is lifted off a ground level with the device 60. In some embodiments, protrusions (not shown) may extend from the lip 62 to help secure a sheet therebetween.

Figure 5:
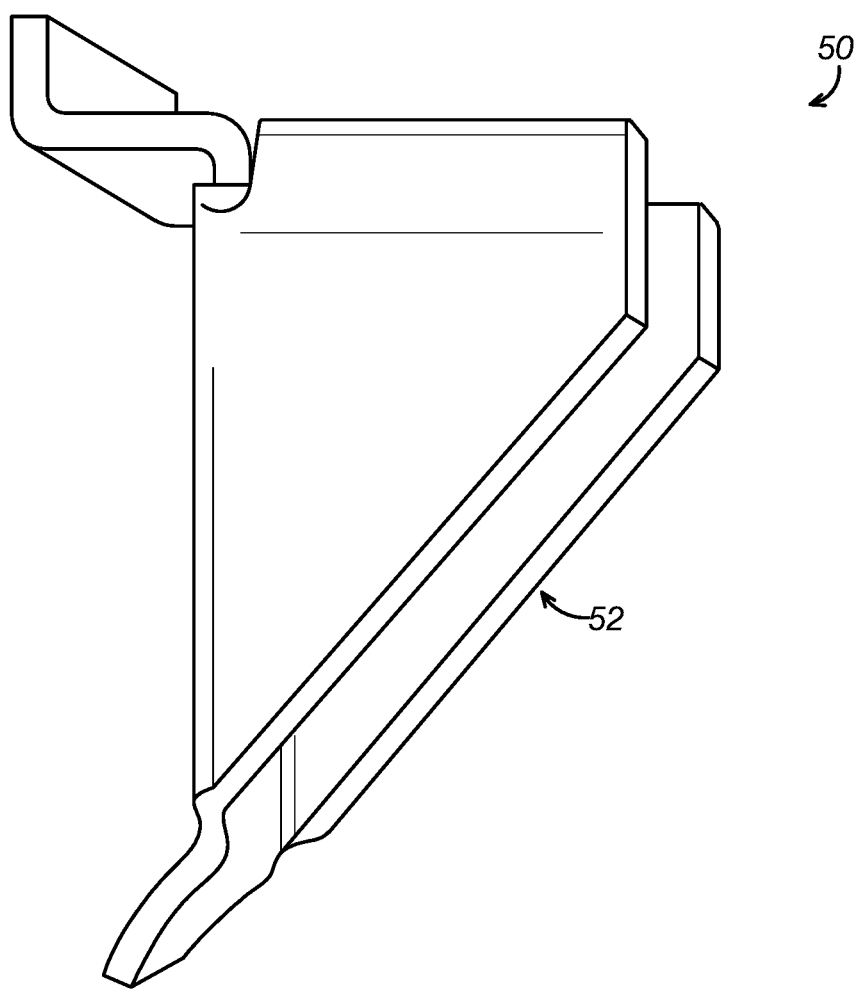
FIG. 5 illustrates a side view of an alternate embodiment of a sheet material supporting device according to an exemplary embodiment of the present invention.

In some embodiments, as shown in FIG. 5, the rounded edge 14 may be replaced with a flat edge 52 to provide a device 50. The device 50 can include all of the features of the previously described device 10. FIG. 3 shows the flat edged product in use on a stud member 30.

The device 10, 50, 60 may be made from various materials, including metal, plastic, or the like. Typically, the device 10, 50, 60 is made from metal, such as durable steel to provide for multiple placements and removals.

As discussed above the device of the present invention can be used to hold a sheet material on a wall or raise a sheet off a floor surface. In addition, the device may be used to hold sheet material onto a ceiling. In this embodiment, the device 10 may attach to a wall stud and the ceiling member can be supported by a top edge of the lip 20. In this embodiment, the length of the shelf 18 may be extended to ensure secure retention of the ceiling sheet panel prior to fastening. In some embodiments, the lip 20 may extend upward (as shown) and then extend at an angle away from the stud member 30. This provides not only additional distance for support of ceiling members that meet a wall, but also can allow a slope for directing wall sheets to the shelf 18, easing placement thereof.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A tool for positioning a sheet member, consisting of:
   a pair of side members configured to straddle a stud member, each of the pair of side members having a front side, a back side opposite the front side, a top side and a bottom side opposite the top side;
   a back member spanning between the front side of each of the pair of side members forming an interior region defined by the pair of side members and the back member, the back member forming the only connection between the pair of side members;

at least one protrusion extending inward, toward the interior region, from and lengthwise along an entirety the top side of at least one of the pair of side members;

a planar shelf extending at a first angle away from a top portion of the back member, the shelf extending away from the front side of each of the pair of side members adjacent the top side thereof;

a lip extending at a third angle at a distal end of the shelf, the distal end of the shelf being distal from an attachment point of the shelf with the top portion of the back member, the lip extending to a lip height greater than a shelf height of the planar shelf, the lip height and the shelf height being relative to the top side of the pair of side members; and an angled portion extending at a second angle away from a bottom portion of the back member; the angled portion further continually extending away from the front side of each of the pair of side members.

2. The tool of claim 1, wherein the lip spans between opposing side members of the shelf.

3. The tool of claim 1, wherein the first angle is substantially a right angle.

4. The tool of claim 2, wherein the third angle is substantially a right angle.

5. The tool of claim 2, wherein the second angle is from about 10 to about 45 degrees.

6. The tool of claim 2, further consisting of an extension extending at a fourth angle at a distal edge of the angled portion.

7. The tool of claim 1, wherein the at least one protrusion is at least two protrusions disposed along a top edge of both of the pair of side members, wherein a distance between opposing ones of the at least two protrusions is smaller than a width of the stud member.

8. The tool of claim 1, wherein at least a portion of an outer edge of the pair of side members is rounded.

9. A tool for positioning a sheet member, consisting of:
a pair of side members configured to straddle a stud member, each of the pair of side members having a front side, a back side opposite the front side, a top side and a bottom side opposite the top side, wherein at least a portion of an outer edge of the pair of side members is rounded;

a back member disposed between the front side of each of the pair of side members, the back member forming the only connection between the pair of side members;

at least one protrusion extending inward from and lengthwise along an entirety of the top side of each of the pair of side members, the at least one protrusion positioned at and extending along a top edge of the side members;

a planar shelf extending at a first angle away from a top portion of the back member and away from a front side of each of the side members, the top portion of the back member disposed between the front side of each of the pair of side members adjacent the top side thereof;

a lip extending at a third angle at a distal end of the shelf, the lip extending to a lip height greater than a shelf height of the planar shelf, the lip height and the shelf height being relative to the top side of the pair of side members; and an angled portion extending at a second angle away from a bottom portion of the back member, the angled portion further continually extending away from the front side of each of the pair of side members.

10. The tool of claim 9, wherein the first angle is substantially a right angle.

11. The tool of claim 9, wherein the third angle is substantially a right angle.

12. The tool of claim 9, wherein the second angle is from about 10 to about 45 degrees.

13. The tool of claim 9, further consisting of an extension extending at a fourth angle at a distal edge of the angled portion.

14. The tool according to claim 1, wherein the at least one protrusion extends inward and terminates pointing toward a plane defined by the interior space.

15. The tool according to claim 9, wherein the at least one protrusion extends inward and terminates pointing toward a plane defined by an interior space defined within the side members and the back member.

* * * * *